UNITED STATES PATENT OFFICE.

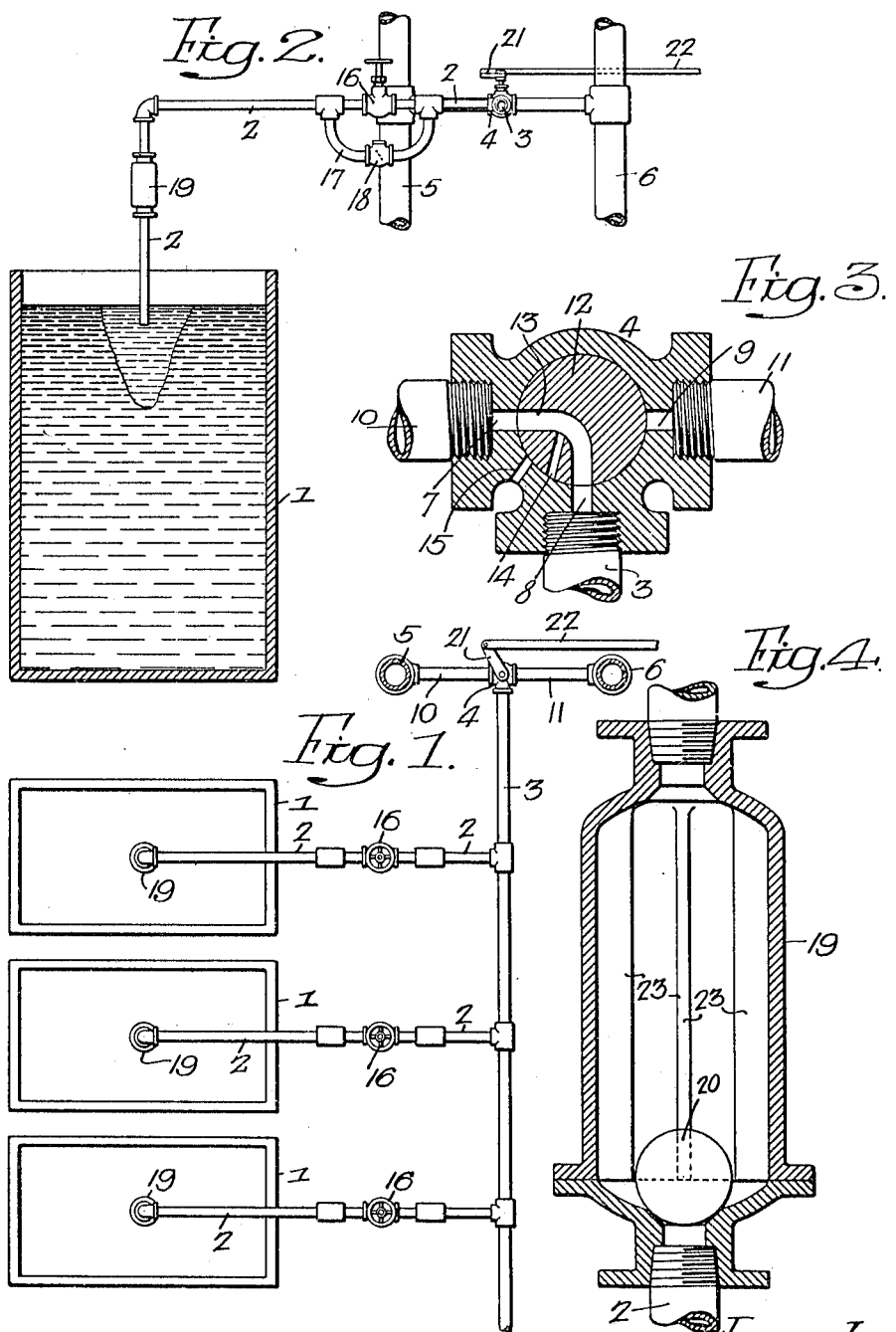

JOHN H. BELL, OF HADDONFIELD, NEW JERSEY.

ICE-MAKING APPARATUS.

1,227,369.  Specification of Letters Patent.  Patented May 22, 1917.

Application filed June 19, 1915. Serial No. 35,044.

*To all whom it may concern:*

Be it known that I, JOHN H. BELL, a citizen of the United States, residing in Haddonfield, Camden county, State of New Jersey, have invented certain Improvements in Ice-Making Apparatus, of which the following is a specification.

One object of my invention is to provide a relatively simple apparatus having but few moving parts, for automatically agitating the water in one or any number of containers while such water is exposed to a low temperature, in order that the ice produced from said water may be free from air bubbles and particles of foreign material, it being also desired that said apparatus shall be of such a nature and so assembled as not to be easily put out of order or require but a minimum of attention and repair.

These objects and other advantageous ends I secure as hereinafter set forth, reference being had to the accompanying drawings, in which, Figure 1 is a plan, partly in section, illustrating my invention arranged for agitating the water in a plurality of containers;

Fig. 2 is a vertical section taken through one of the containers shown in Fig. 1; and Figs. 3 and 4 are vertical sections, on a scale larger than that of the other figures, illustrating details of the invention.

As is understood by those skilled in the art, if the water in the cans of an ice making plant be constantly agitated while it is being frozen, the freezing process is hastened and the ice produced is perfectly clear, it being kept thereby free from air bubbles and also from contamination by particles of foreign material or coloring matter which may be present in the water. In order to cause such agitation of the water while it is being frozen, I provide the apparatus shown in the above drawings, and in the latter, 1 represents the cans or tanks in which water is to be frozen by any suitable form of refrigerating apparatus. For each of these tanks I provide a pipe 2 supported in any desired manner so as to extend slightly below the surface of the water at or adjacent the vertical center line of each can and each of these pipes is connected to a main 3 which, through a cock or valve 4 is capable of being put in communication either with a conduit 5 leading from a source of air under pressure, or on the other hand, to a conduit 6 in connection with a pump or tank whereby a vacuum may be produced. In other words, said conduit 6 is connected to some agency or device whereby the air is exhausted from it and from the main 3 when the latter is connected thereto, and similarly the conduit 5 is capable of introducing into said main air under pressure.

The valve 4, while being of any suitable construction, is preferably made as shown in Fig. 3, with ports 7 and 9 extending in the same line and communicating with conduits 10 and 11 which connect with the pressure and exhaust lines 5 and 6 respectively while the port 8 of this valve communicates with the main 3. The movable member 12 of the valve 4 is shown as provided with a passage 13 capable of connecting the port 8 either with the port 7 or with the port 9 and it also has a relief port 14 designed to communicate with the port 8 when one end of the passage 13 is in communication with a port or vent 15 through the casing of said valve.

At a suitable point in each of the conduits 2, I place a throttle valve 16, and provide around each of these valves a by-pass 17 including a check valve 18. Said check valves are each so placed that they will permit the free flow of air through the pipe 2 and the by-pass toward the main 3, but will prevent a flow in the opposite direction. Also included in each of the conduits 2, preferably adjacent the outer end thereof, is a casing 19 containing a buoyant valve 20 of suitable material such as cork, which will seat at either end of said casing so as to prevent more than a predetermined and definitely limited outflow of fluid.

The movable member 12 of the valve 4 is periodically oscillated through an angle of 90 degrees by means of an arm 21 and a link 22 connected to any desired and suitable form of operating mechanism for causing reciprocating motion, whose detail construction since it forms no part of the present invention, is not illustrated. It should be noted however that under conditions of operation said link would be reciprocated from 40 to 60 times a minute, although obviously, this rate of operation may be widely varied without departing from my invention.

With the various parts assembled and arranged in the positions shown, and the tanks immersed in brine after having been filled with water, it is obvious that if the movable member of the valve 4 is in the position illustrated in Fig. 3, the main 3 and the pipe 2 are connected to the source of air under pressure constituted by the pressure line 5. The check valves 18 however prevent such air flowing through the by-pass, and although the throttle valves 16 are partially closed, the flow of air out of the pipes 2 is prevented by the valves 20, which are seated at the bottoms of their respective casings 19. If now the movable member 12 of the valve 4 be turned in a counterclockwise direction through an angle of 90 degrees, the air under pressure is cut off from the main 3 and such air is relieved from said main when the port 14 registers with the port 8, since at that time the passage 13 is vented through the port 15.

Thereafter the passage 13 is brought into such a position as to connect the ports 8 and 9, whereupon the air is exhausted from the main 3 and from all of the pipes 2. By reason of this exhaustion the air is drawn out of said conduits, past the check valves 18, and since the outer ends of said pipes are below the surface of the water in the tanks or cans, such water flows therefrom into the casings 19. The exhaustion is allowed to continue until all of the casings are filled, when it is stopped by reason of the valves 20 seating at the tops of said casings where they are brought by floating on the water therein.

On the return stroke of the rod 22, the movable member 12 of the valve 4 is turned in a clockwise direction, so that air at atmospheric pressure is admitted to the main 3 through the passage 13 and ports 14 and 15, while immediately thereafter said passage 13 is made to connect the ports 7 and 8. The high pressure air thus delivered to the main 3 and to the pipes 2 forcibly drives out the water from the casings 19, causing a more or less violent agitation of liquid in the several tanks as it flows into the same. It is noted however, that all of the valves 16 are partially closed so as to regulate the violence of this agitating action, and when the water is driven out of the various casings 19, the valves 20 therein seat in their lower positions, thus preventing the escape of air and stopping the agitating action. A subsequent movement of the link 22 now relieves the air pressure in the main 3 and pipes 2, thereafter causing these elements to be connected to the exhaust line 6 which sets up a thorough agitation of the tanks 1 as the water is drawn therefrom into the casings 19.

The above-described agitation of the water therefore causes the ice produced to be of the clear quality desired and it is obvious that the moving parts of the apparatus which might get out of order or require attention, are relatively few in number as well as of an uncomplicated nature.

From the above description it will be understood that each casing 19 with its valve 20 insures that but a predetermined amount of water shall be actually removed from and returned to each of the tanks 1 in each cycle of operation of the apparatus, for obviously after each casing 19 has been drawn full of water, the further suction due to the element 12 of the valve 4 permitting a continued connection of the main 3 with the exhaust line 6, has no effect and similarly after the water has been driven from the casing 19, escape of air under pressure is prevented by the valve 20.

By the use of the throttle valve 16 the violent ejection of the water is prevented and it is possible to vary the agitation caused by such action as the freezing of the water progresses and the volume of the water capable of circulation is decreased. At the same time, the check valve 18 and its by-pass permit of the free inflow of water to the casing 19 independently of the valve 16 which would otherwise materially diminish the speed of this part of the cycle of operation.

By venting the main 3 immediately before it is connected to the pressure and exhaust lines, an inefficient operation of the system is prevented, since otherwise the air under pressure remaining in said main and its connected pipes after connection with the pressure line 5 had been cut off, would materially reduce the vacuum in the line 6 without allowing filling of the casings 19 for a considerable time. Similarly the connection of the main 3 with the atmosphere before it is put in communication with the pressure line 5 prevents the useless expenditure of compressed air. If desired, I may provide guides 23 in each of the casings 19 in order to insure that the ball 20 shall properly engage its seat at either end of its path of movement.

I claim:—

1. The combination in ice making apparatus of exhaust and pressure lines; a conduit leading to a container for liquid to be frozen; and means for alternately connecting said conduit to said lines.

2. The combination in ice making apparatus of exhaust and pressure lines; a conduit leading to a container for liquid to be frozen; and means for alternately connecting said conduit to said lines; said means including a device for venting said conduit previous to each of its connections with the exhaust and pressure lines.

3. The combination in ice making apparatus of exhaust and pressure lines; a conduit leading to a container for liquid to be frozen; and means for alternately connecting said means to said lines; said means including a device for venting said conduit after each of its connections to the pressure line.

4. The combination in ice making apparatus of exhaust and pressure lines; a conduit leading to a container for liquid to be frozen; means for alternately connecting said conduit to said lines; with means for limiting the amount of liquid drawn into the conduit when it is connected to the exhaust line.

5. The combination in ice making apparatus of exhaust and pressure lines; a conduit leading to a container for liquid to be frozen; means for alternately connecting said conduit to said lines; and means in the conduit for throttling the flow of fluid therethrough.

6. The combination in ice making apparatus of exhaust and pressure lines; a conduit leading to a container for liquid to be frozen; means for alternately connecting said conduit to said lines; means in the conduit for throttling the flow of fluid therethrough; and a by-pass to said means permitting flow of fluid in but one direction only.

7. The combination in ice making apparatus of a conduit leading to a container for liquid to be frozen; means for causing flow of fluid in said conduit alternately in opposite directions; a casing connected in the conduit; and a valve in the form of a freely movable ball float seating both at the inlet and outlet of the casing.

8. The combination in ice making apparatus of a conduit leading to a container for liquid to be frozen; means for inducing a flow of liquid from said container into and out of said conduit; with a ball float valve freely movable in the conduit for limiting the amount of liquid capable of passing into the same and preventing escape of fluid from the conduit after the liquid has been expelled therefrom.

9. The combination in ice making apparatus of exhaust and pressure lines; a conduit leading to a container for liquid to be frozen; a valve for alternately connecting said conduit to said lines; with means for periodically operating said valve.

10. The combination in an ice making apparatus of a conduit leading to a container for liquid to be frozen; a throttle valve in said conduit; a by-pass connected in said conduit; a check valve in the by-pass; a casing connected in the conduit between said valve and the liquid container; a valve in the casing capable of closing either the inlet or the outlet thereof; and means for causing the pressure in the conduit to be alternately above and below that of the atmosphere.

JOHN H. BELL.

Copies of this patent may be obtained for five cents each, by addressing the "Commissioner of Patents, Washington, D. C."